United States Patent [19]
Thompson

[11] 3,881,424
[45] May 6, 1975

[54] STORAGE AND RETRIEVAL ARRANGEMENT

[75] Inventor: Harry W. Thompson, Chicago, Ill.

[73] Assignee: Interlake, Inc., Chicago, Ill.

[22] Filed: Nov. 16, 1973

[21] Appl. No.: 416,385

Related U.S. Application Data

[60] Division of Ser. No. 230,788, March 1, 1972, which is a continuation of Ser. No. 98,193, Dec. 14, 1970, which is a continuation of Ser. No. 737,199, June 4, 1968.

[52] U.S. Cl........... 104/48; 214/16.1 R; 214/16.4 B
[51] Int. Cl.............................................. B60s 13/02
[58] Field of Search ....... 104/48, 50, 127, 128, 129; 214/16.1 R, 16.1 C, 16.1 CC, 16.1 CE, 16.4 R, 16.4 A, 16.4 B

[56] References Cited
UNITED STATES PATENTS

| | | | |
|---|---|---|---|
| 815,796 | 3/1906 | Conheim | 214/16.1 R |
| 1,366,292 | 1/1921 | Smith | 104/48 |
| 2,019,182 | 10/1935 | Gipe | 214/16.1 R |
| 2,432,046 | 3/1969 | Krusinski | 214/16.4 B |
| 3,294,260 | 12/1966 | Frangos | 214/16.1 R |
| 3,445,009 | 5/1969 | Burch | 214/16.4 B |
| 3,503,530 | 3/1970 | Burch | 214/16.4 B |

Primary Examiner—M. Henson Wood, Jr.
Assistant Examiner—D. W. Keen
Attorney, Agent, or Firm—Molinare, Allegretti, Newitt & Witcoff

[57] ABSTRACT

In a storage and retrieval arrangement, a rail mounted load carrier is adapted to move up and down aisles formed between spaced bin-type storage frames. The load carrier includes a pair of upstanding masts which rollably engage an overhead rail and a lift platform, carrying a pair of extendible forks, elevatable between the masts. A transfer car is provided to movably transfer the load carrier between the aisles by rolling along rails disposed upon the floor; the floor being at the same level as the floors in the aisles. The transfer car includes a bed having a plurality of load beams which support rollers and a plurality of rails which are adapted to be aligned with the rails of the aisles and receive the load carrier; the load beams and rollers being spaced from each other by a predetermined distance to provide direct support to the load carrier when the load carrier is being transferred. The transfer car is also adapted to simultaneously transfer a pick-up conveyor and delivery conveyor with the load carrier.

8 Claims, 20 Drawing Figures

STORAGE AND RETRIEVAL ARRANGEMENT

This is a division of application Ser. No. 230,788, filed Mar. 1, 1972, which application is a continuation of application Ser. No. 98,193 filed Dec. 14, 1970, which application, in turn, was a continuation of application Ser. No. 737,199, filed June 14, 1968.

BACKGROUND OF THE INVENTION

This invention relates to a storage and retrieval arrangement and, more particularly, to a new and improved structure wherein articles may be either mechanically stored or removed from storage bins opening to a plurality of aisles.

In prior storage frame arrangements, it was frequently necessary that personnel physically enter the storage area to palce articles in storage bins or remove the articles therefrom. If the articles were of small size and/or light weight, such prior arrangements were relatively satisfactory. But, where the articles to be handled are of extremely heavy weight and/or of large size, or where a number of articles must be simultaneously stored or removed on pallets, the aforementioned manual arrangements were unsatisfactory. Some of the disadvantages of the aforementioned arrangements were overcome by the use of a fork lift truck. However, the fork lift truck also presented certain disadvantages in that the width of the aisles must necessarily be increased to provide for maneuverability of the truck. Also personnel were still required to enter the storage area itself and the fork lift truck arrangement was not readily adaptable to automated methods. Where a fork lift truck was employed, severe limitations were also imposed on useable storage height, due to the limitation of height within which a fork lift truck is operable.

To overcome the disadvantages of the prior arrangements, various load carrying arrangements have been proposed. These arrangements generally are characterized by a mechanical load carrier assembly which may be moved longitudinally in the aisle formed between the storage bins. Such load carriers may either be remotely controlled or manned by personnel and generally include a lift platform which is adapted to be elevated to the desired bin location. Since these load carriers are relatively large and complex, each individual unit is quite expensive. Where a large number of storage frames and aisles are present in storage areas of extensive size, it has been generally necessary to provide a load carrier in each of the aisles in which it is desired to realize the advantages of the mechanical load carrier assemblies to store and remove articles from the bins. As a consequence, such multiple duplication of equipment results in substantially increased equipment costs and construction. Frequently, this substantial cost increase rendered the assemblies prohibitive.

An arrangement constructed in accordance with the principles of my invention substantially reduces the cost of extensive storage installations and virtually eliminates the need for a large number of load carriers to service the bins, since a given load carrier may be transferred between aisles and thus may be used in a plurality of the storage frame aisles. Moreover, preexisting arrangements may be readily adapted to my arrangement myarrangement without extensive cost or reconstruction of the storage area such as the provision of a pit to accommodate the load carrier transfer arrangement. Not only is the load carrier of my arrangement capable of multiple aisle use, but necessary load conveying elements are also capable of repetitive use between the various aisles. Finally, the arrangement constructed in accordance with the principles of my invention is extremely compact and reliable and avoids many personnel hazards presented by previous arrangements, as well as being readily adapted to be used in automated systems.

SUMMARY OF THE INVENTION

A storage and retrieval arrangement constructed in accordance with the principles of my invention includes a plurality of storage frames separated from each other to define a plurality of aisles therebetween. A load carrier is arranged to move longitudinally in the aisles and is adapted to store or remove articles from bins in the storage frames. A transfer car is adapted to transfer the load carrier from one aisle to another, thus enabling the load carrier to be used selectively in any of the aisles; the transfer car firmly supporting the weight of the load carrier when the load carrier is disposed upon the transfer car. The transfer car is movable in the same horizontal plane as the floors of the aisles, obviating the need for a pit or other irregular structure for supporting the transfer car.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

General Description Of Arrangement

Figure 1:
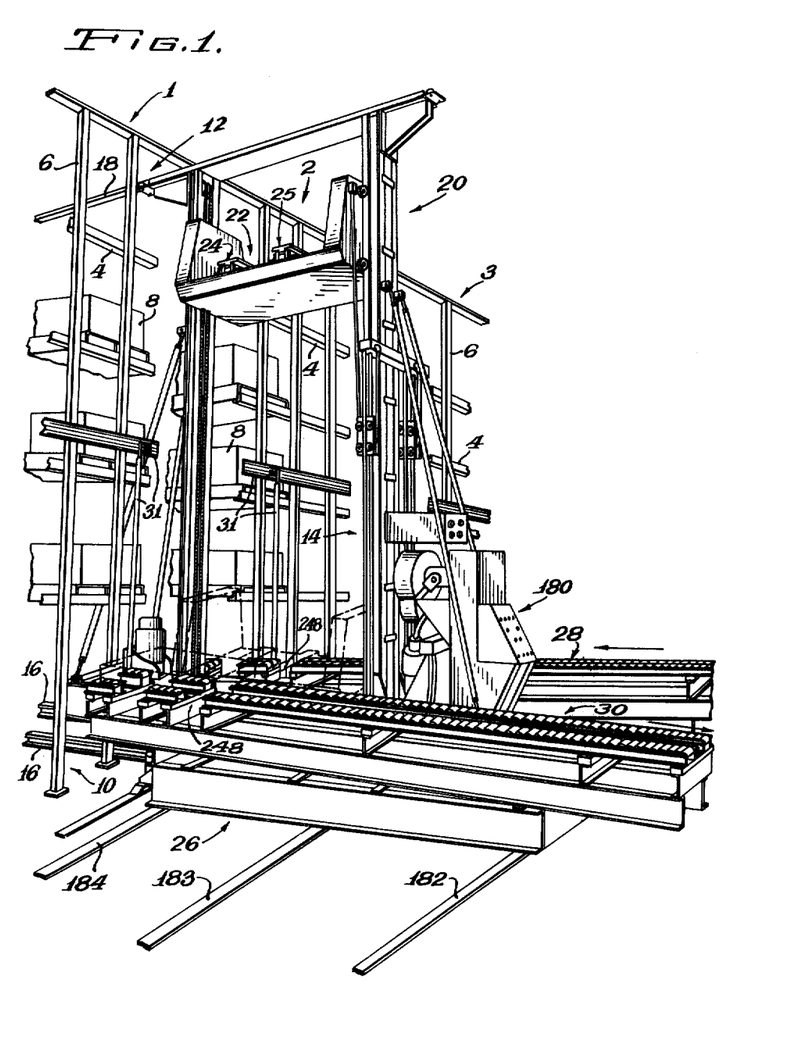
FIG. 1 is an isometric view of a preferred embodiment of the storage and retrieval arrangement of the present invention.

The overall general arrangement of the preferred embodiment of the present invention is shown in FIG. 1. In general, the arrangement includes a plurality of storage frames 1, 2 and 3 comprising a plurality of horizontal 4 and vertical 6 support members. The horizontal members 4 directly support the stored articles 8. These articles may either be large individual items spanning the distance between the horizontal support members 4 of each bin or they may be palletized as shown. The vertical support members 8 rest upon the floor 10 of the storage area and may extend to the ceiling thereof. Each of the banks of storage frames 1 and 2, 2 and 3 are spaced apart from each other by an aisles 12 and 14. A pair of spaced parallel rails 16 are mounted upon the floor 10 and an overhead rail 18 is mounted in the center of each aisle adjacent the tops of the storage frames. A load carrier 20 is provided which operates between the respective storage frames 1, 2 and 3 in either of the aisles 14 or 16. The load carrier 20 is adapted to move longitudinally up and down either of the aisles 12 and 14 and a lift platform 22 is provided on the load carrier which is adapted to move in a vertical direction. The lift platform is equipped with forks 24 and 25 which are movable to either side of the lift platform and are adapted to extend into the bins to deposit or remove selected articles from storage.

A transfer car 26 is located adjacent the ends of the storage frames 1, 2 and 3 and is adapted to move in a direction normal to the aisles 12 and 14. When it is desired to transfer the load carrier 20 from one aisle to another aisle, the load carrier is disposed upon the transfer car 26 and the transfer car is moved to the aisle to which it is desired to operate the load carrier. When the transfer car 20 is aligned with the last mentioned aisle, the load carrier is then moved off the transfer car and down the selected aisle. The transfer car 26 also supports and is capable of transferring a pick-up conveyor 28 and a delivery conveyor 30 for use in conjunction with the load carrier 20. Appropriate sliding bus and conductor arrangement 31 and 31' are provided to supply power to the transfer car and load carrier machinery.

Detailed Description Of The Load Carrier

Figure 2:
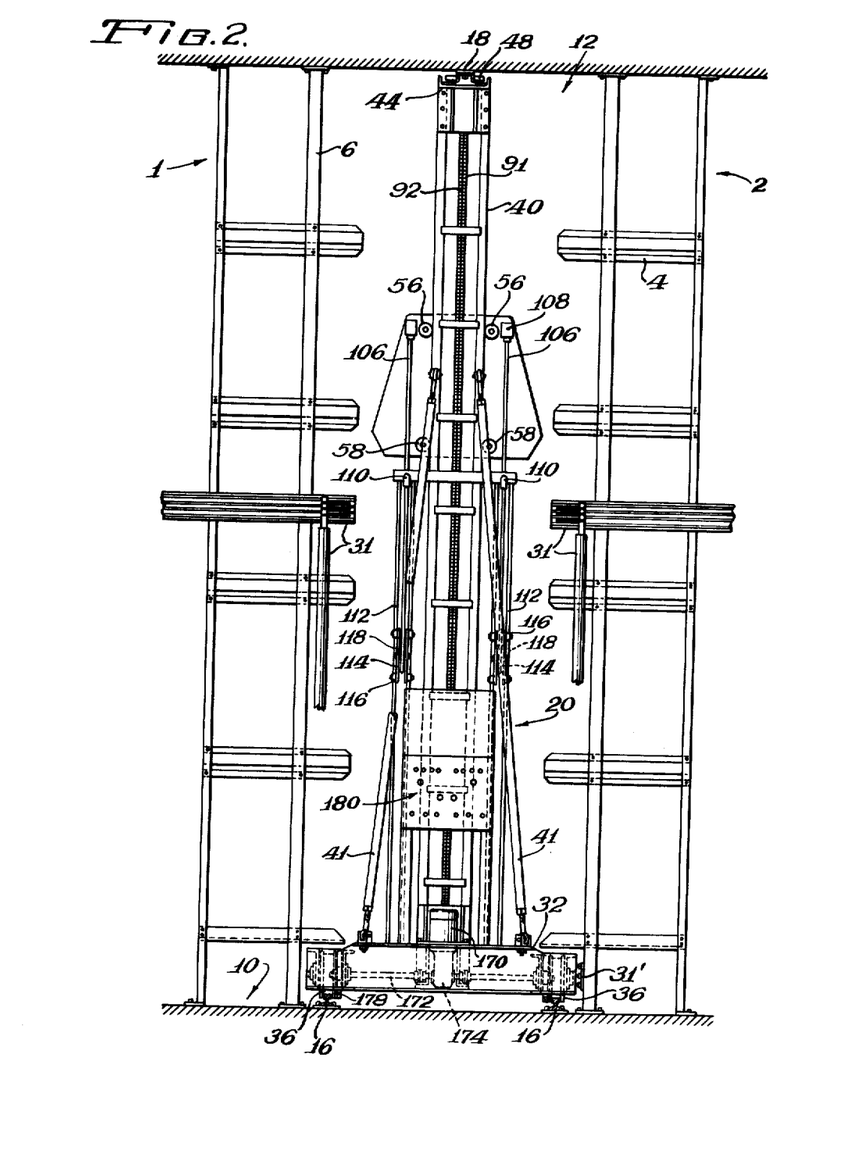
FIG. 2 is an end elevation view of the storage frames and load carrier.
Figure 3:
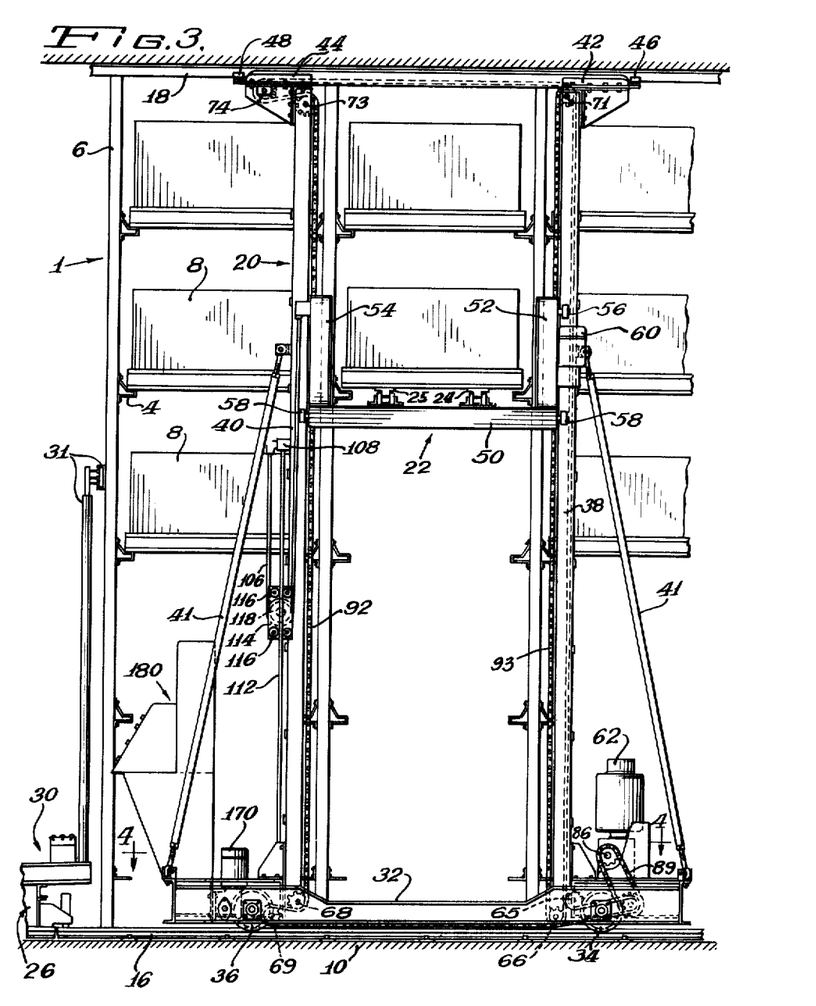
FIG. 3 is a side elevation view of the load carrier.
Figure 4:
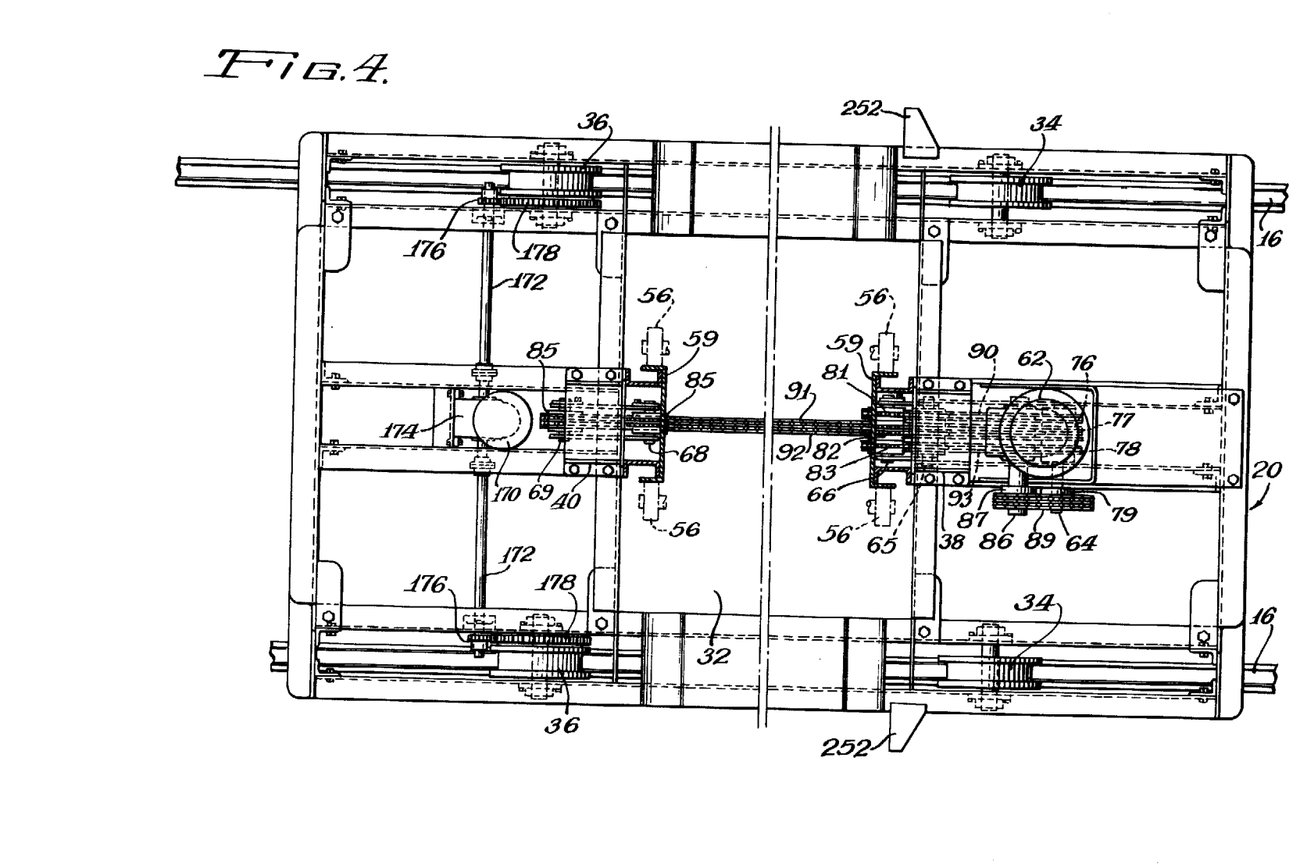
FIG. 4 is a cross-sectioned plan view of the load carrier taken along line 4 — 4 of FIG. 3.

Referring to FIGS. 2 - 4, the load carrier of the preferred embodiment of the present invention, comprises a trolley base 32 of a generally rectangular configuration. Two pair of rollers 34 and 36 are rotatably mounted upon each end of the base 32, the rollers engaging the parallel rails 16 in the aisle 12 and providing for rolling support of the load carrier 20. Offset toward the center of the base 32 from its ends are a pair of upwardly extending masts 38 and 40 which are rigidly mounted upon the base 32 and are further supported by struts 41 running between the base 32 and each of the masts. Located, at the top of each of the masts 38 and 40 is a generally right angled frame member 42 and 44, respectively, extending away from the center of the load carrier and each carrying a pair of spaced horizontal rollers 46 and 48 at their extreme ends. The rollers 46 and 48 are arranged to straddle the overhead rail 18 and prevent lateral movement of the top of the load carrier 20. Such lateral movement might particularly be present due to cantilever effect resulting when an article is being deposited or removed from one of the storage bins by the extended forks 24 and 25.

Figure 5:
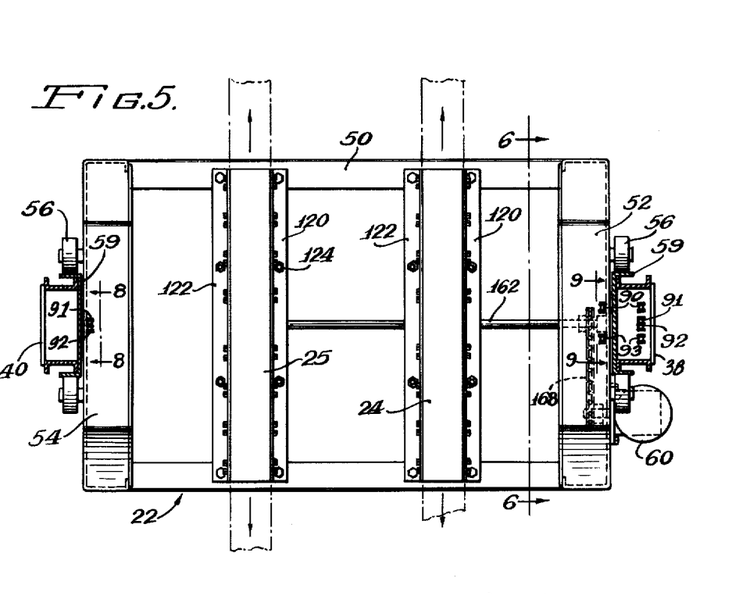
FIG. 5 is a plan view of the load carrier lift platform.

The lift platform 22 is carried between the masts 38 and 40 and is adapted to be selectively raised and lowered through a series of sprockets and chains which will be described in more detail later. The lift platform 22 includes a generally rectangular bed 50 and a pair of upstanding end panels 52 and 54 at either end of the bed adjacent masts 38 and 40, respectively. Mounted upon the outer side of each of the panels 52 and 54 are a pair of upper rollers 56 and lower rollers 58 which are spaced from each other and straddle the webs of a component channel 59 on each side of their respective masts as shown in FIGS. 4 and 5, the webs acting as guide members during the raising and lowering of the lift platform 22 to prevent the lift platform from swinging in a lateral direction or tilting from cantilever effect. Mounted on the exterior side of end panel 52, is a fork operating motor 60. The forks 24 are arranged on the upper side of the bed 50 and are adapted to be telescopically extended from either side of the bed to carry the selected articles to be deposited in or removed from the respective storage bins. The construction of the forks and their drive arrangement will be described in more detail later.

Figure 6:
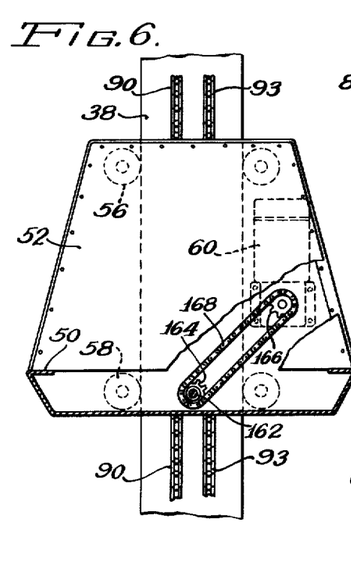
FIG. 6 is a cross-sectioned end elevation view of the lift platform taken along line 6—6 of FIGS. 5 with a part of the end panel broken away.
Figure 7:
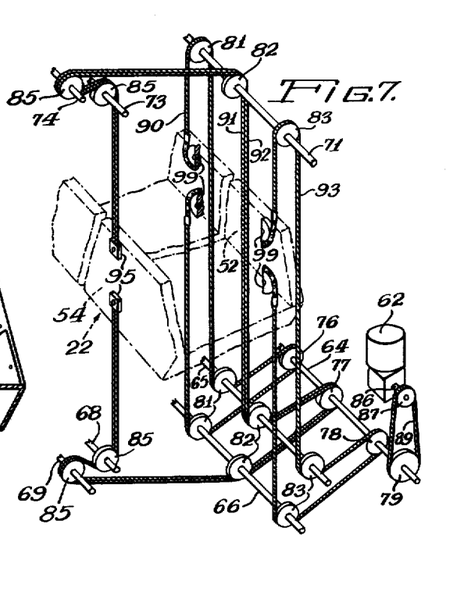
FIG. 7 is a schematic view of the chain hoist and sprocket arrangement of the load carrier.

Referring to FIGS. 3, 4, 6 and 7, the lift platform is raised and lowered by a hoist lift motor 62 which is mounted upon one end of the trolley base 32. The hoist chain arrangement includes eight shafts carrying suitable sprockets and mounted at various locations on the load carrier 20. As best seen in FIGS. 3 and 7, shafts 64, 65 and 66 are rotatably mounted at the hoist lift motor end of the trolley base 32 on the trolley base. Shafts 68 and 69 are also rotatably mounted on the trolley base 32 but at the end opposite the hoist lift motor 62; shaft 71 is rotatably mounted to mast 38 at its right angled frame 42 vertically above shafts 64, 65 and 66; and shafts 73 and 74 are rotatably mounted upon the mast 40 at its upper end vertically above shafts 68 and 69. Shaft 64 carries four sprockets 76, 77, 78 and 79, sprocket 77 being a double sprocket, and shafts 65, 66 and 71 each carry three sprockets 81, 82 and 83, sprockets 82 being double sprockets. Shafts 68, 69, 73 and 74 each carry one sprocket 85, each of the sprockets 85 being a double sprocket. The hoist lift motor 62 includes a drive shaft 86 having a sprocket 87. Five drive chains are provided to raise and lower the platform 22. Drive chain 89 is trained about sprockets 79 and 87. Drive chain 90 extends from end panel 52 of the lift platform, over sprocket 81 on shaft 71, under sprocket 81 on shaft 65, around sprocket 76, around sprocket 81 on shaft 66 and back to the lift platform. A pair of drive chains 91 and 92 extend from end panel 54 of the lift platform, are trained over double sprocket 85 on shaft 73, around double sprocket 85 on shaft 74, over double sprocket 82 on shaft 71, beneath double sprocket 82 on shaft 65, around double sprocket 77 on drive shaft 64, under double sprocket 82 on shaft 66, around double sprockets 85 on shafts 69 and 68, and back to end panel 54. Drive chain 93 extends from end panel 52 over sprocket 83 on shaft 71, beneath sprocket 83 on shaft 65, around sprocket 78 on drive shaft 64, around sprocket 83 on shaft 66 and back to end panel 52. It will readily be seen when viewing FIGS. 4 and 7 together, that the separation of the sprockets is exaggerated in FIG. 7 for the purpose of clarity. In actuality, the sprockets are located adjacent each other as shown in FIG. 4.

Figure 8:
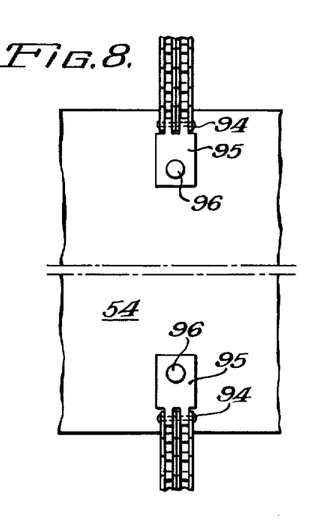
FIG. 8 is a view of an arrangement for anchoring some of the hoist chains to the lift platform taken along line 8—8 of FIG. 5.
Figure 9:
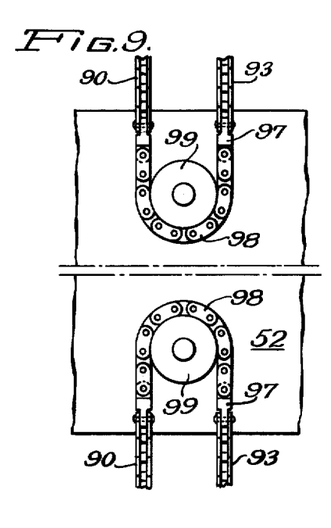
FIG. 9 is a view of an arrangement for anchoring the remainder of the hoist chains to the lift platform taken along line 9—9 of FIG. 5.

The double chains 91 and 92 are not continuous but are broken in their vertical legs between shafts 68 and 73 and each of the ends are anchored to the top and bottom of panel 54, as shown in FIG. 8, by a pin 94 and a block 95. The block 95 is, in turn, pinned within the end panel 54 at 96 such that the block may pivotally move about the pin 96. The single chains 90 and 93, are also broken, as shown in FIG. 9, and the ends of each of the chains 90 and 93 carry a universal coupling 97, the couplings being connected together by a looped segment of chain 98. The couplings 97 adapt the looped segment 98 to twist independently of the chains 90 and 93. The chain segments 98 are each trained about rollers 99 which are rotatably mounted within the inside of the top and bottom of the end panel 52. It will thus be seen that, in actuality, chains 90 and 93 form one long chain. Although the segments 98 are trained about rollers 99, it is not anticipated that the chains 90 and 93 will move a substantial amount about the rollers during the actual raising and lowering of the lift platform. The rollers 99 provide an anchoring structure on the platform for the chains and allow some play in the platform with relation to the chains 90 and 93 during operation while providing for even loading of the chains.

As an example, the direction of rotation of the various shafts, sprockets, and chains will be described where it is desired to raise the lift platform 22. The hoist lift motor 62 is energized driving drive shaft 86 and its sprocket 87 in a clockwise direction, drive chain 89 in a clockwise direction, sprocket 79 in a clockwise direction, and its associated shaft 64 in a clockwise direction. Rotation of shaft 64 in a clockwise direction, rotates sprockets 76, 77 and 78 in a clockwise direction and chains 90, 91, 92 and 93 also in a clockwise direction. Thus, shafts 66, 69, 71 and 74 idle in a clockwise direction and shafts 65, 68 and 73 idle in a counterclockwise direction. Since all the chains are moving in a clockwise direction, each of the chains will exert an upward pull on their respective end panels 52 and 54 at their upper anchoring rollers 99 and blocks 95, respectively, and conversely the chains will be slackened at their lower anchoring rollers 99 and blocks 95 and the lift platform 22 will rise. It will be readily apparent that operation of the hoist lift motor 62 in the opposite direction will drive the chains in a counterclockwise direction lowering the lift platform 22.

The above described multiple reeving arrangement is effective to distribute the load equally between each of the chains and, in turn, each of the chains exerts a balanced and equal lifting or lowering force on the platform, since the chains each exert their lifting force on symmetrically opposite ends of the platform in a vertical direction and since the same number of chains is provided at both ends of the platform. Thus, twisting of the chains is avoided and uneven wear is substantially reduced. Moreover, since each of the chains bears a load which is substantially identical to the loads borne by the remaining chains, all the chains may be of the same specifications avoiding unnecessary spare part storage problems and allowing standardization.

It will be apparent when considering the disclosed reeving arrangement, that the lift platform is operable over substantially the entire vertical length of the masts. The upper ends of the end panels 52 and 54 of lift platform 22 may be lifted to within only a few inches of the top of each of the masts 38 and 40, i.e., to the top of the masts less the diameter of sprockets 81, 82 and 83 on shaft 71 and sprocket 85 on shaft 73. At the bottom of the masts, bed 50 of the lift platform 22 may be lowered to the recessed bed between the masts 38 and 40, as shown in FIG. 3, of the trolley base 32. It should also be evident that the described reeving arrangement may be readily adapted to load carriers having various length lift platforms without necessitating the replacement of any of the hoist arrangement components. To adapt the above described reeving arrangement to load carriers of different lengths, it is only necessary to add or remove links from the double chains 91 and 92 to adjust their lengths. Similarly, the reeving arrangement may be readily adapted to load carriers having longer or shorter masts simply by adding or removing links from each of the chains 90, 91, 92 and 93. Thus, the shafts, sprockets, etc., of the reeving arrangement may be prefabricated for and readily interchanged between load carriers of different sizes due to their uniformity.

Figures 10, 11, 12, 13, 14:
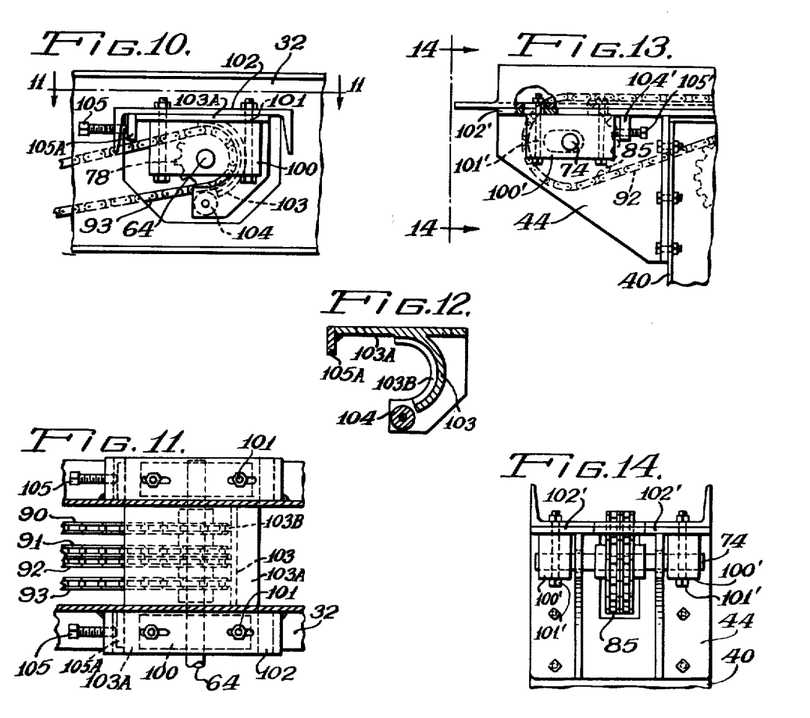
FIG. 10 is a side elevation view of an adjustable chain hoist drive shaft and chain cover arrangement.
FIG. 11 is a plan view of the adjustable drive shaft and chain cover taken along line 11 — 11 of FIG. 10.
FIG. 12 is a cross-sectioned side elevation view of the chain cover of FIG. 10.
FIG. 13 is a side elevation view of an adjustable chain hoist idler shaft arrangement.
FIG. 14 is an end elevation view of the adjustable arrangement taken along line 14 — 14 of FIG. 13.

An adjustable pillow block arrangement is also provided to mount certain of the aforementioned shafts on the load carrier. As shown in FIGS. 10 and 11, the drive shaft 64 extends between and is journaled through a pair of blocks 100 which are adjustably suspended by bolts 101 from a stationary member 102 fixed to each side of the frame of the trolley bed 32. A chain guard 103 is fixed to and extends below a horizontal plate 103A, the plate being sandwiched between the blocks 100 and stationary member 102. The bolts 101 extend through the plate. The chain guard 103 carries ribs 103B which are aligned with sprockets 76, 77 and 78 and extend into the center of each chain to confine and urge the chains 90, 91, 92 and 93 into engagement with their respective sprocket teeth. An elongated roller 104 may also be carried between the ends of the chain guard 103 to engage the chains and urge them into engagement with their respective sprocket teeth. An adjusting screw 105 is threaded through a downwardly extending flange of the stationary member 102 and is arranged to bear against a tab 105A which extends downwardly from the plate 103A to adapt the arrangement for horizontal adjustment. It should be noted that the previously described multiple chain reeving arrangement allows chain guard protection around at least 180° of the drive sprockets 76, 77 and 78, thus substantially eliminating the possibility of the chains jumping from the drive sprockets.

To adjust the shaft 64, the bolts 101 are loosened and the adjusting screw 105 is merely turned in the desired direction. As the screw 105 is turned, the shaft 64 with its sprockets and the plate 103A with its chain guard 103 and roller 104 move horizontally as a unit. When the shaft 64 has been positioned in its desired location, the bolts 101 are tightened locking the aforementioned elements in place.

In FIGS. 13 and 14, a second adjustable pillow block arrangement is shown for adjusting shaft 74 at the top of mast 40. Although not shown, another adjustable arrangement, like that shown in FIGS. 13 and 14, is provided on the frame of the bed 32 for allowing adjustment of shaft 69. Referring to FIGS. 13 and 14, a pair of blocks 100' are provided which are suspended from the right angled frame member 44 at the top of mast 40 by bolts 101' extending through a horizontal portion 102' of the right angled member 44. A tab 104' extends downwardly from beneath the horizontal portion 102' and an adjusting screw 105' is carried by the tab 104'. The horizontal position of the shaft 74 is adjusted horizontally in substantially the same manner as previously described with respect to the pillow block arrangement shown in FIGS. 10 and 11.

The adjustable mounting arrangements of shafts 64, 69 and 74 provide a ready means of adjusting the tension of the chains 90, 91, 92 and 93 without necessitating the removal of links. For example, to remove slack from the chains, the bolts 101 are loosened and the adjusting screw 105 is turned bearing on tab 105A and urging the plate 103A to the right, as viewed in FIGS. 10 and 11. As the plate 103A moves to the right, the chain guard 103, roller 104, the block 100 and the shaft 64 with its associated sprockets also moves to the right, increasing the tension on chains 90, 91, 92 and 93. When the shaft 64 has been moved to a location where the chain tension desired obtains, the bolts 101 are again tightened locking the block 100, plate 103A and shaft 64 in place.

The provision of the adjustable arrangement on shafts 69 and 74 provides a means whereby the platform may easily be leveled. If, for example, the lift platform 22 is out of level such that its panel 54 is lower than panel 52, the bolts 101', shown in FIGS. 13 and 14, are loosened freeing the block 100' at the top of mast 40. Similarly the corresponding block rotatably mounting shaft 69 at the bottom of mast 40 is also loosened. Shaft 74 is now moved to the left and shaft 69 to the right, as viewed in FIG. 7 lifting end panel 54 until it is disposed at the same level as end panel 52. The shaft mounting blocks are then secured in their desired position by tightening the bolts 101'. It will again be evident that the lift platform 22 may readily be leveled without requiring the removal of links from the lift chains or the expenditure of excessive time or effort.

Although the hoist chain arrangement is shown employed in a load carrier having a floor running trolley base, it is contemplated that the hoist chain arrangement may be utilized in a load carrier in which the trolley base is either overhead running or center running, i.e., where the masts extend from each side of the trolley base and the trolley base runs at a level intermediate the overhead and the floor. Of course in a center running load carrier, the trolley base would be constructed to allow the lift platform to pass therethrough during the raising and lowering of the platform between the extremes of the upwardly and downwardly projecting masts.

Since a suitable electric connector must be electrically connected to the fork operating motor 60 to provide a power source for the motor, an arrangement is provided to prevent fouling of the electrical connection during the raising and lowering of the lift platform. As best shown in FIGS. 2 and 3, a pair of appropriate conductor wires 106 are attached at one of their ends to a connector 108 on end panel 54 and at their other ends to connectors 110 on mast 40. The mast 40 carries a pair of vertical guide members 112 and a pair of weighted pulley-like members 114 which are adapted to ride up and down the guide members via rollers 116 which straddle the guide members 112. Each conductor wire 106 is looped beneath a roller 118 on each of the pulley-like members 114. Thus as the platform 22 is raised, the loop of the conductors 106 is moved in an upward direction drawing each of the pulley-like members 114 with its upwardly along its guide member 112, the pulley-like member 114 continuing to exert a downward force maintaining the conductors 106 in a substantially taut condition. As the lift platform 22 is lowered, the loops are also lowered lowering each of the pulley-like members 114 continuing to maintain the conductors 105 taut to prevent fouling.

Figure 15:
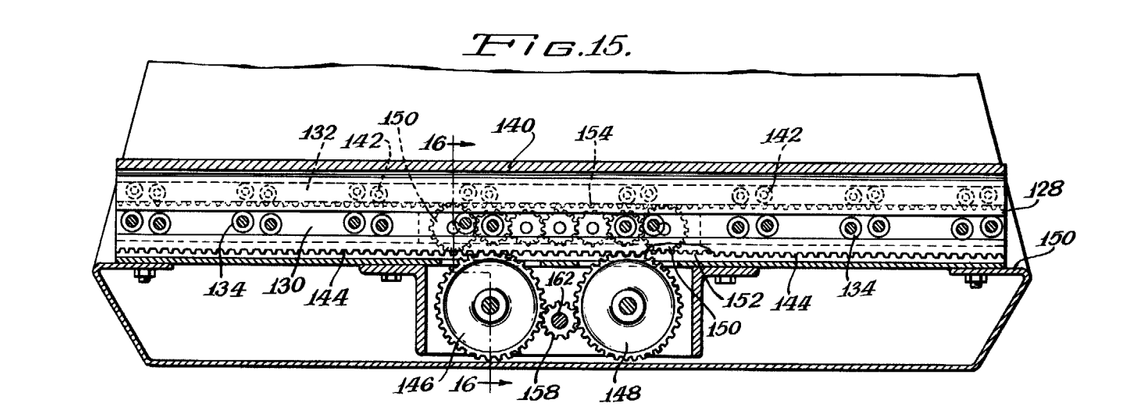
FIG. 15 is a cross-sectioned side elevation view of the forks of the lift platform taken along line 15 — 15 of FIG. 16.
Figure 16:
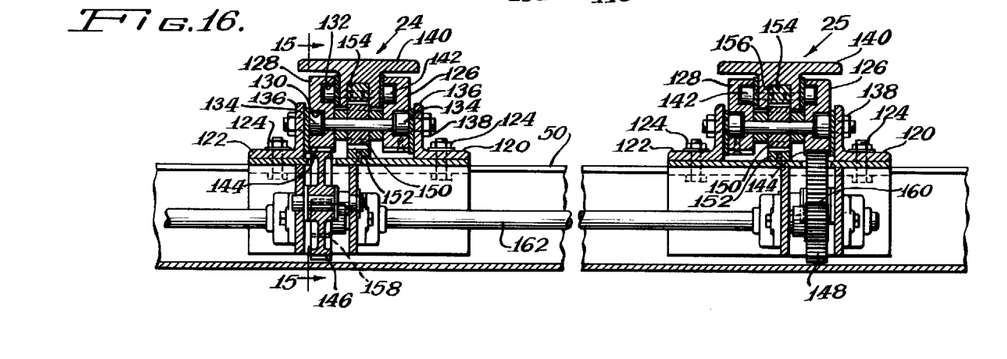
FIG. 16 is a cross-sectioned end elevation view of the forks taken along line 16 — 16 of FIG. 15.

Referring to FIGS. 15 and 16, the fork construction of the lift platform will now be described. Each of the forks 24 and 25 comprises a pair of spaced angle irons 120 and 122 rigidly bolted by bolts 124 to the bed 50. Disposed between each of the angle irons 120 and 122, are a pair of S - shaped side bars 126 and 128. Each of the side bars includes a longitudinal groove 130 on the face proximate the angle irons 120 and 122 and another longitudinal groove 132 on the opposite face. A plurality of rollers 134 are rotatably mounted on the upstanding leg 136 of each of the angle irons 120 and 122 by bolts 138, the rollers 134 extending into the longitudinal groove 130 and rollably supporting each of the S - shaped side bars 126 and 128. A T - bar 140 surmounts the S - shaped side bars 126 and 128 and extends between the side bars. Rotatably mounted on the vertical portion of each of the T - bars 140, are a plurality of rollers 142 which extend into the longitudinal grooves 132 of the S - shaped side bars. Thus it will be seen, that the S - shaped side bars 126 and 128 are longitudinally movable with respect to the angle irons 120 and 122 and the T - bars 140 are longitudinally movable with respect to the S - shaped side bars. The bottom surface of at least one of the S - shaped side bars of each of the forks 24 and 25 carries rack teeth 144 which engage with teeth of respective drive gears 146 and 148. One drive gear is provided for each of the forks 24 and 25; drive gear 146 driving fork 24 and drive gear 148 driving fork 25. Also rotatably mounted to and between each of the S - shaped bars 126 and 128 are a plurality of gears 150. The teeth of gears 150 engage the teetrh of both a fixed rack 152 which is secured to the bed 50 and a rack 154 which is mounted in a grooved portion 156 of the vertical portion of the T - bar 140. When the drive gears 146 and 148 are driven, they rotate driving the rack 144 on the bottom of the S - shaped side bars. The side bars therefore move in a longitudinal direction along the rollers 134 which are disposed in grooves 130. The longitudinal movement of the S - shaped side bars 126 and 128 carries the T - shaped side bars 140 in a longitudinal direction. Superimposed upon the longitudinal speed caused by the movement of the S - shaped side bars 126 and 128, is the added speed resulting from the engagement of the gears 150 with the teeth of racks 152 and 154, producing an increased longitudinal speed of the T - bars 140. The gears 150, are carried along with the S - shaped side bars 126 and 128, and since they engage the fixed rack 152, the gears 150 are rotated. Since the gears 150 are also in engagement with the rack 154 in the T-bar groove 156, they drive that rack and its associated T - bar 140. The drive gears 146 and 148 are, in turn, driven by a pair of gears 158 and 160, respectively, which are driven via drive shaft 162. Referring to FIG. 6, the drive shaft 162 is rotated via sprockets 164 and 166 and chain 168 which, in turn, are driven by the fork operating motor 60 which is mounted on an exterior side of erd panel 52. It will be noted that rotation of the fork operating motor 60 in one direction will telescope the forks 24 and 25 to one side of the lift platform 22 and operation in the opposite direction will retract the forks or extend them to the opposite side of the lift platform.

Referring again to FIGS. 2, 3 and 4, the end of the trolley base 32 opposite the hoist lift motor 62 includes a suitable drive motor 170 for driving the load carrier 20 horizontally along its aisle rails 16. The drive motor 170 is connected to a pair of transverse drive shafts 172 via an appropriate gear box arrangement 174. A drive gear 176 is located at the terminal end of each of the drive shafts 172 drivingly engaging a suitable gear 178 rigidly affixed to the side of each of the pair of rollers 36. Also disposed at the drive motor end of the trolley base 32 is a control switch board 180 for controlling, via appropriate electrical circuitry (not shown), the drive motor 170, hoist lift motor 62 and fork operating motor 60 of the load carrier. Such circuitry is not shown as it is not deemed to be the subject matter of the present invention. Although, the control switchboard is shown as being mounted upon the load carrier 20, it will be readily apparent that it may be remotely located.

Detailed Description Of The Transfer Arrangement

Referring to FIGS. 1 and 17 – 20, a preferred embodiment of the transfer arrangement of the present invention is shown. A transfer car 26 is provided which is movable along a plurality of rails 182, 183 and 184 in a direction substantially normal to the aisles 12 and 14. The transfer car 26 includes a bed portion 186 which is adapted to receive the load carrier 20, the bed portion being straddled by a pair of raised end portions 188 and 190. Three load beams 192, 193 and 194 extend partially beneath the bed from the raised end portions 188 and 190. Each of the load beams is spaced from each other by a distance such that when the entire load carrier 20 is disposed upon the transfer car 26 in transfer position, each of the load carrier rollers 34 and 36 will be disposed directly above load beams 192 and 194, respectively.

Figure 18:
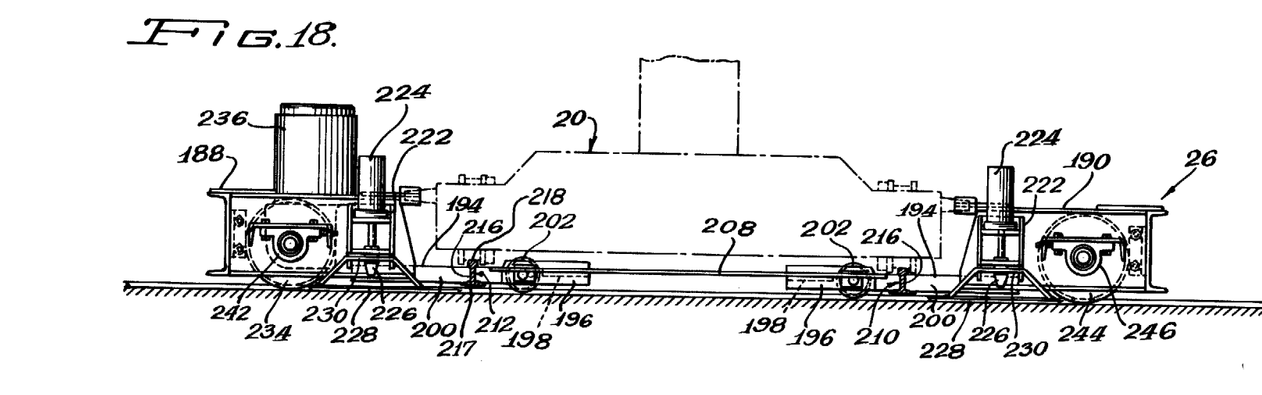
FIG. 18 is an end elevation view of the transfer car taken along line 18 — 18 of FIG. 17.
Figure 20:
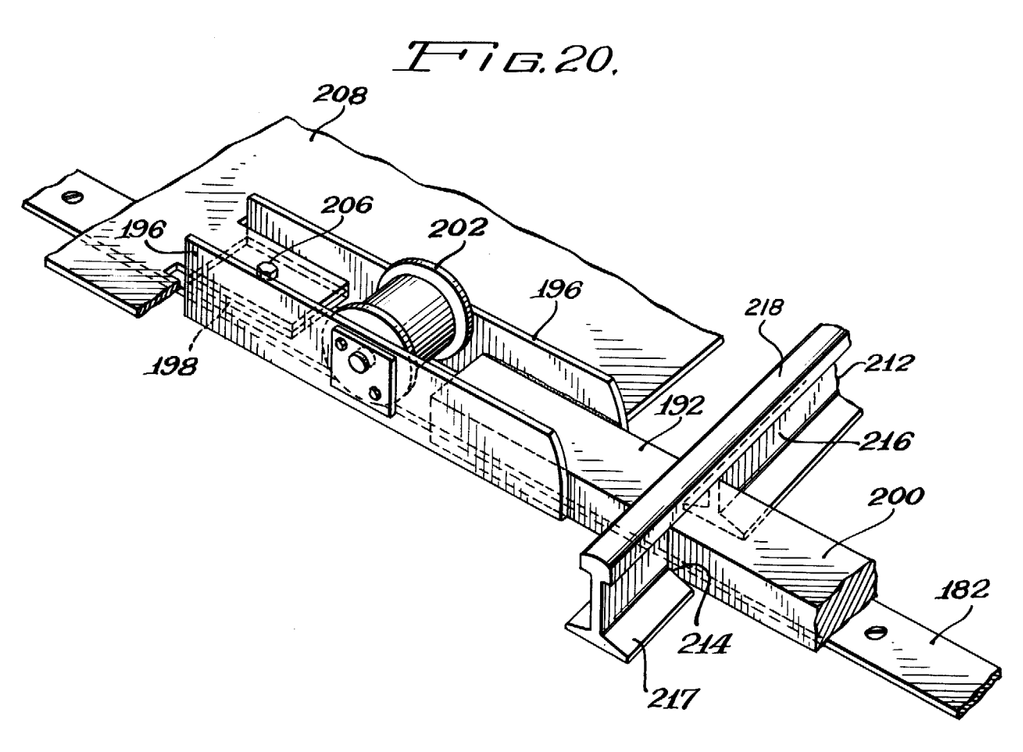
FIG. 20 is an enlarged view of the roller, load beam, and rail arrangement of the transfer car.

As best viewed in FIGS. 18 and 20, each of the load beams comprises a pair of vertical plates 196, each having a generally horizontal web 198 over part of their length which extends toward the center of the bed portion 186. A heavy rigid bar 200 is welded between the other ends of each of the plates 196 and is rigidly attached as its other end, as by welding, to the rigid frame structure of each of the raised end portions 188 and 190 of the transfer car. The horizontal web 198 terminates short of the inner end of the bar 200 and a roller 202 is rotatably mounted upon the vertical plates 196 in the space between the end of the web 198 and bar 200. Rigidly attached by bolts 206 to the horizontal web 198 of each of the load beams 192, 193 and 194, is a rigid plate 208 which connects the load beams together maintaining the beams horizontally spaced from each other while providing a smooth personnel walking surface. A pair of rails 210 and 212 are disposed upon the bed in perpendicular relationship to the load beams 192, 193 and 194. The rails 210 and 212 are spaced from each other by a distance identical to the spacing of the aisle rails 16. The points of intersection of the rails 210 and 212 with the load beams 192, 193 and 194 are proximate to the rollers 202 and 204, respectively, and at those points each of the rails, as best seen in FIG. 20, carries a notch 214 substantially through its vertical web portion 216 and lower flange 217. The notches 214 allow the rails to be inserted in a straddling relationship over the load beams 192, 193 and 194 such that the rolling surface 218 of the rails 210 and 212 may be positioned at the level of the rolling surface of the aisle rails 16 without necessitating the use of a pit or depression in the floor beneath the transfer car 26 to provide for the proper alignment of the rails' rolling surfaces. Moreover, if any deflection is realized in the transfer car bed portion 186, movement of the transfer car would not be inhibited by contact of the lower flange 217 of the rails 210 and 212 with the transfer car rails 182, 183 and 184, since the notches 214 would accommodate the transfer car rails by also straddling them.

Figure 17:
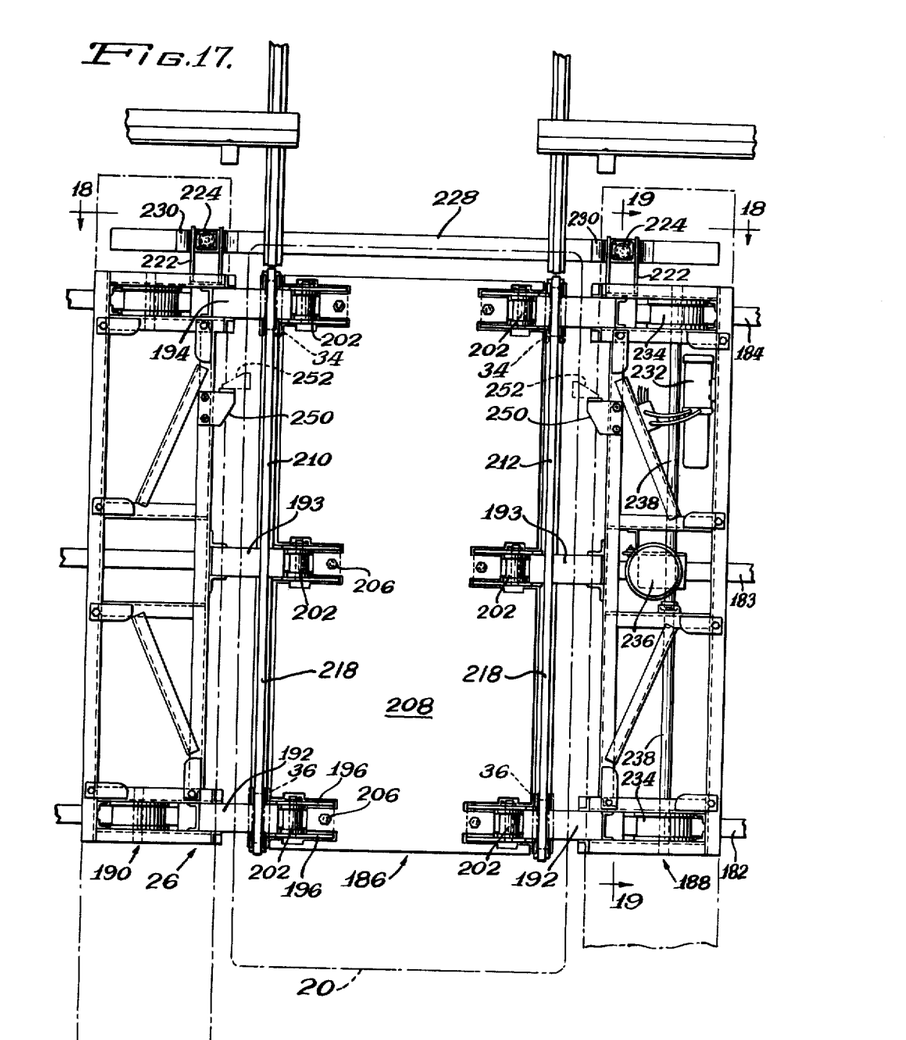
FIG. 17 is a plan view of the transfer car of the present invention.

The side of the transfer car facing the storage frames carries a pair of projecting frames 222 mounted upon each of the raised end portions 188 and 190. A hydraulic cylinder and piston 224 and tapered plunger 226 having a tapered portion 227, is mounted on each of the frames 222. A rail-like base 228 resting upon the floor, extends parallel to the transfer car rails 182, 183 and 184 between transfer car rail 184 and the storage frames. Spaced along the rail-like base 228, at preselected positions, are a plurality of raised plates 230 each having an opening 232 therein of a size to accommodate the plunger 226. When aligning the bed of the transfer car 26 with a selected aisle, the transfer car is approximately placed in alignment with the aisle and the hydraulic piston 224 and plunger 226 is actuated forcing the plunger 226 in a downward direction. If the bed 186 is closely, but not exactly aligned with the aisle, the tapered portion 227 of each of the plungers upon entering the openings 232 in each of the plates 230, will cause the final necessary vernier movement of the entire transfer car in one direction or the other as necessary. Also, the plungers 226, when in their downward disposition in the plate openings 232, will lock in place the transfer car preventing any movement whatsoever of the transfer car during the storage and retrieval operation or, more generally, during movement of the load carrier on and off the bed of the transfer car.

Figure 19:
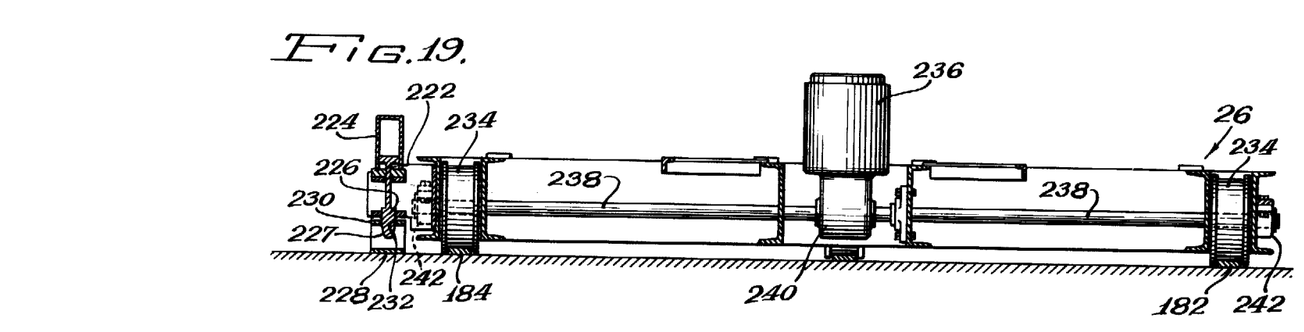
FIG. 19 is a cross-sectioned side elevation view of the transfer car taken along line 19 — 19 of FIG. 17.

The raised end portions 188 and 190 of the transfer car are constructed of suitable structural framing which will not be described in detail. Mounted upon raised end portion 188 is a hydraulic pump 232 for operating the hydraulic cylinder and piston 224 as previously described. Also mounted upon raised end portion 188, are a pair of drive rollers 234 which engage the transfer car rails 182 and 184. As best seen in FIG. 19, a transfer car drive motor 236 is carried upon end portion 188 and drivingly rotates a pair of drive shafts 238 via a suitable gear box 240; the drive shafts 238, in turn, driving the drive rollers 234. Since the transfer car is subjected to excessive loads, the drive shafts 238 are preferably journaled in pillow blocks 242 mounted on the frame of the transfer car. Raised end portion 190 carries a second pair of rollers 244 which also engage the transfer car rails 182 and 184. These rollers 244 are also rotatably mounted to the frame of the transfer car via pillow blocks 246 and the rollers 244 preferably idle during movement of the transfer car. Referring to FIG. 17, the raised end portions 188 and 190 also each carry a stop 250 which is positioned to engage a bumper 252 mounted upon the load carrier 20 to position the load carrier on the transfer car 26 for transfer between the aisles.

When considering the above detailed description of the transfer car, it will be noted that the weight of the load carrier is evenly distributed to the rails 182, 183 and 184 principally through the rollers 202 and to a substantially lesser extent through their associated rollers 234 and 244 via the rigid bar 200 and the end portions' frames. The plate 208 is not subjected to the vertical forces resulting from the weight of the load carrier, the plate 208 merely acting to maintain the load beams and rails 210 and 212 properly horizontally spaced from each other.

Referring again to FIG. 1, the frame structure of each of the raised end portions 188 and 190 also acts to support the pick-up conveyor 28 and delivery conveyor 30, respectively. These conveyors may be permanently attached to their respective raised end portions and may be either of the powered or gravity operated type. The pick-up and delivery end of each of the conveyors may be suitabley interrupted as at 248 to allow insertion and lifting of the forks 24 and 25 of the lift platform of the load carrier 20. It will readily be seen that when the transfer car is moved from one aisle to another aisle, the pick-up conveyor 28 and delivery conveyor 30 are also moved simultaneously therewith, thus obviating the need of separate conveyors for each aisle.

From the aforementioned description of the preferred embodiment of the storage and retrieval arrangement of my invention, the operation of that embodiment will be evident. However, for the purpose of clarity, a detailed description of the operation follows.

Detailed Description Of Operation

At the commencement of operation it will be assumed that the load carrier 20 and transfer car 26 are properly aligned with an aisle in which it is desired to store and retrieve articles, for example aisle 12 as shown in FIG. 1. Let us also assume that a palletized article has been delvered from the right, as viewed in FIG. 1, has moved by gravity down the rolls of pick-up conveyor 28, and has come to rest adjacent the end of the storage frame 2 and the load carrier 20. The load carrier 20 is partially disposed upon the transfer car 26 such that its lift platform 22 is disposed between the pick-up conveyor 28 and the delivery conveyor 30 at their storage frame ends; the load carrier rollers 36 being disposed upon the rails 210 and 212 of the transfer car and the load carrier rollers 34 extending into the aisle and resting upon aisle rails 16. Also before commencing operation, the lift platform 22 has been lowered to the level of the pick-up conveyor 28 in preparation for picking up the article to be removed therefrom and stored in the appropriate storage bin.

An appropriate order is now entered by the operator in the control switchboard 180, informing the load carrier 20 where to store the article now located upon the pick-up conveyor 28. At the same time an order may be given to the load carrier 20, via the control switchboard 180, telling the loaded carrier 20 where to go to retrieve a stored article for the purpose of bringing the article out to the delivery conveyor 30 after the article which is now on the pick-up conveyor has been stored.

These orders might be given to the control switchboard at the same time or individually at different times depending upon the switchboard construction, the details of which are not deemed to be part of the herein described invention.

Assuming that both a storage and a retrieval order are given simultaneously to the load carrier 20 for purposes of describing the full mechanical operation of the arrangement, the lift platform forks 24 and 25 are telescopically extended from the lift platform 22 beneath the article resting upon the pick-up conveyor 28. Referring particularly to FIGS. 5, 6, 15 and 16, when the forks 24 and 25 are to be extended, an electrical signal, via appropriate circuitry (not shown), energizes the fork operating motor 60, rotating sprocket 166, chain 168, sprocket 164, and drive shaft 162, as viewed in FIG. 6. Rotation of the shaft 162 rotates gears 158 and 160 also in the same direction, as viewed in FIG. 15. Since the gears 158 and 160 mesh with gears 146 and 148 respectively, the rotation of gears 158 and 160 in one direction cause the gears 146 and 148 to rotate in the opposite direction. Gears 146 and 148 engage the teeth of the racks 144 at the bottom of one each of the S-shaped side bars 126 and 128, driving the S-shaped side bars in the direction of rotation of gears 146 and 148. The S-shaped side bars 126 and 128 carry their associated T-bars 140 in the same direction as the moving S-shaped side bars. Upon movement of the S-shaped side bars 126 and 128, gears 150 are also carried in the direction of the latter mentioned movement. Since each of the gears 150 are in toothed engagement with the fixed racks 152, the gears 150 rotate when the S-shaped side bars 126 and 128 move. Rotation of the gears 150 as the S-shaped side bars are moving, causes an additional movement to be superimposed upon the already moving T-bars due to the engagement of the gears 150 with the teeth of the racks 154 located within the groove 156 of each of the T-bars. Thus, a telescoping action results wherein movement of the S-shaped side bars 126 and 128 occurs at a given speed and movement of the T-bars 140 proceeds at a greater speed than said given speed in the same direction.

When the forks 24 and 25 have been fully extended beneath the article on the pick-up conveyor 28 into its interrupted area 248, the fork operating motor 60 is de-energized and the hoist lift motor 62 is energized to lift the platform 22 to engage the forks 24 and 25 with the bottom of the article and lift the article free of the pick-up conveyor 28.

To lift the lift platform 22 and its associated forks 24 and 25, the hoist lift motor 62 is energized in a direction to rotate the sprocket 87, chain 89, and sprocket 79, and shaft 64 in a clockwise direction, referring particularly to FIG. 7. Rotation of the shaft 64 in a clockwise direction causes rotation, in a clockwise direction, of sprockets 76, 77 and 78, which in turn causes rotation, also in a clockwise direction, of chains 90 and 93 and double chains 91 and 92. As described earlier the clockwise rotation of the chains 90 and 93 causes a lifting force to be exerted upon the upper rollers 99 mounted on the end panel 52 of the lift platform, the chains 90 and 93 being slacked about the lower roller 99 and beneath the lift platform. The clockwise rotation of double chains 91 and 92 causes a lifting force to be exerted upon the upper block 95 mounted on the end panel 54 of the lift platform, the double chains 91 and 92 being slacked at the lower block 95 and beneath the platform. As the forks 24 and 25 come into contact with the bottom of the article during the aforementioned lifting of the lift platform, the article is lifted free of the pick-up conveyor 28 and the forks are now retracted onto the lift platform by operation of the fork operating motor 60 in a direction opposite to that previously described.

When the forks 24 and 25 have been fully retracted and the article to be stored is disposed upon the lift platform 22, the drive motor 170 may now be energized to move the load carrier 20 longitudinally down the aisle 12 to the desired storage location. As the load carrier 20 is moving horizontally down the aisle, operation of the hoist lift motor 52 may continue until the lift platform 22 is properly vertically positioned with respect to the location of the bin in which it is desired to store the article. Referring in particular to FIGS. 3 and 4, the drive motor 170, upon being energized, drives the rollers 36 in the appropriate direction, via the gear box 174, drive shafts 172, drive gears 176, and gears 178, to move the load carrier 20 longitudinally into the aisle 12. When the load carrier 20 is properly horizontally positioned and its lift platform 22 is vertically positioned with respect to the bin in which it is desired to store the article, the forks 24 and 25 are again extended in the appropriate direction in the manner previously described into the proper bin and the article to be stored is carried into the bin. The lift platform 22 is then slightly lowered by the hoist lift motor 62 disposing the article upon the supporting horizontal members 4 in the bin and disengaging the forks from the bottom of the article. The forks 24 and 25 are then retracted onto the platform 22, and the load carrier is ready to proceed to the bin from which it is desired to retrieve an article.

During horizontal movement of the load carrier 20 to the location of the bin from which it is desired to remove an article, the hoist lift motor 62 operates to raise or lower the lift platform 22 as necessary to position the lift platform vertically with respect to the forthcoming bin. When the load carrier 20 and lift platform 22 are properly positioned in the horizontal and vertical directions with respect to the bin, the forks 24 and 25 are again extended beneath the article desired to be retrieved, and the lift platform 22 is raised slightly again to contact the extended forks with the bottom of the article and lift the article free of its storage bin. The forks 24 and 25 are then retracted until the article is disposed upon the lift platform 22. The drive motor 170 and the hoist lift motor 62 are again energized moving the load carrier 20 longitudinally down the aisle toward the transfer car 26 and lowering the lift platform 22 to the level of the delivery conveyor 30 respectively.

The load carrier 20 moves horizontally down the asle 12 until its rollers 36 are again disposed upon rails 210 and 212 of the transfer car 26; its rollers 34 resting upon the rails 16 in the aisle. When the load carrier 20 is so disposed, the lift platform 22 has been lowered to the level of the delivery conveyor 30, and the drive motor 170 and hoist lift motor 62 has been deenergized, the fork operating motor 60 is again energied extending the forks 24 and 25 into the interruptions 248 of the delivery conveyor 30, carrying the retrieved article from the lift platform 22 and disposing the article vertically above the rollers of the delivery conveyor 30. When the forks 24 and 25 are fully extended, the hoist lift motor 62 is again energized to slightly lower the lift platform 22, causing the forks to drop beneath the surface of the rollers of the delivery platform and deposit the article upon the rollers. As soon as the article is deposited upon the rollers and disengaged from the forks 24 and 25, the article moves to the right, as viewed in FIG. 1, down the delivery conveyor 30 by either power or gravity depending on the construction of the conveyor and the forks may be again retracted as previously described. Thus, the load carrier is now ready to receive another order from the control switchboard 180 to either store and/or retrieve another article as hereinbefore described.

If it is desired to store or retrieve an article in another one of the aisles, the load carrier 20 may be transferred from the aisle in which it is located to the desired aisle. To transfer the load carrier, the drive motor 170 is again energized driving the load carrier 20 to the right as viewed in FIG. 1 until the load carrier is completely disposed upon the bed portion 186 of the transfer car 26. The load carrier 20 moves to the right until its bumpers 252 engage the stops 250 mouted on the raised end portions 188 and 190 of the transfer car. Upon engagement of the stops and bumpers, the drive motor 170 is deenergized and the load carrier is positioned such that its rollers 36 are disposed upon the rails 210 and 212 directly over the load beam 192 and its rollers 34 are also disposed upon the rails 210 and 212 but directly over the load beam 194. The rails 210 and 212 are located closely adjacent the rollers 202 which are rotatably mounted upon their respective load beams. Consequently, a substantially direct line of support of the load carrier 20 to the transfer car rails 182 and 184 is realized principally through rollers 202. Such direct support prevents excessive deflection of the bed 186 of the transfer car which might result from the relatively excessive weight of the load carrier. Thus, the possibility of scraping and resulting interference of the transfer car with the transfer car rails, 182, 183 and 184 or floor during movement of the transfer car which would result from such deflection is avoided. If any slight deflection of the bed is in fact realized, interference with the transverse movement of the transfer car does not occur since the rails 210 and 212 would merely straddie the transfer car rails 182, 183 and 184 at their notches 214, as best seen in FIG. 20. When the load carrier 20 has been fully disposed upon the transfer car 26, its upper right angled frame members 42 and 44 and their associated rollers 46 and 48 are moved off the overhead rail 18 due to the fact that the rail terminates shortly beyond the end of the storage frames 1, 2 and 3. Thus, transverse movement of the load carrier 20 and transfer car 26 is made possible.

Referring to FIGS. 17, 18 and 19, when the load carrier 20 has been fully disposed upon the transfer car 26, the drive motor 236 of the transfer car is energized rotating the drive rollers 234 in the appropriate direction via the gear box 240 and drive shafts 238. The transfer car 26 is thus moved either to the right or the left as desired toward the aisle in which it is desired to operate the load carrier 20. The transfer car 26 is driven for example toward the aisle 14, as shown in FIG. 1, until the rails 210 and 212 of the transfer car are fairly closely aligned with the rails 16 of the desired aisle 14. The transfer car drive motor 236 is then deenergized and the hydraulic pump 232 is energized, pressurizing the hydraulic cylinder and piston 224 and moving the tapered plunger 226 in a downward direction. If the transfer car rails 210 and 212 are slightly misaligned with respect to the aisle rails 16, the tapered portion 227 of the plungers 226 operate to provide a final fine vernier alignment of the aforementioned rails. The fine vernier alignment is affected by the entry of the plunger tapered portions 227 into their respective openings 232 in the plates 230, causing the entire transfer car 26 to move slightly to the right or left as necessary until the plunger 226 is centered on the plate opening 232. When the rails 210 and 212 of the transfer car are aligned with the rails 16 of the aisle and the tapered plunger 226 is fully inserted in the opening 232 of the plate, the transfer car 26 is locked in position and movement of the transfer car is prevented during operation of the load carrier 20 in the desired aisle.

Since the pick-up conveyor 28 and delivery conveyor 30 are supported by the raised end portions 188 and 190 of the transfer car 26, the conveyors are also transferred simultaneously with the load carrier 20. Thus, the need for a multiplicity of conveyors is obviated since only one pair of conveyors need be provided for use with any one of the aisles.

After alignment of the transfer car rails 210 and 212 and the aisle rails 16, the drive motor 170 of the load carrier 20 is again energized to move the load carrier into operating position with respect to the new aisle 14. The load carrier 20 is moved horizontally partially into the aisle such that its rollers 36 remain upon the transfer car rails 210 and 212 and its rollers 34 are again supported by the aisle rails 16 but now in aisle 14. The load carrier 20 may now be operated as previously described to remove articles from the pick-up conveyor 28 and store the articles in the appropriate bins in the new aisle 14 and to remove articles from the appropriate bins in that aisle and deliver them to the delivery conveyor 30.

It should be understood that the embodiment of the invention which has been described is merely illustrative of one of the applications of the principles of the invention. Numerous modifications may be made by those skilled in the art without departing from the true spirit and scope of the invention.

What is claimed is:

1. A transport vehicle for transporting a second movable vehicle upon a substantially horizontal floored area along a predetermined longitudinal path of travel substantially perpendicular to the normal longitudinal path of travel of said second movable vehicle, said second movable vehicle being rollably supported for movement in said normal path of travel by a plurality of spaced rollers, said transport vehicle comprising, a plurality of spaced load supporting beams extending in substantially parallel relationship to said predetermined path of travel and being spaced from each other in the direction of said normal path of travel of the second movable vehicle, said load beams being positioned between the floor of said floored area and the second movable vehicle when the latter vehicle in on said transport vehicle, spaced rollers rotatably mounted on each of said load beams and supporting said transport vehicle for movement on said floor and along said predetermined path of travel, support means on said transport vehicle for supporting the second movable vehicle for movement onto and off of said transport vehicle, said support means being positioned proximate said beam mounted rollers in the direction of said predetermined path of travel, and said beams and said beam mounted rollers being spaced from each other in the direction of said normal path of travel of the second movable vehicle by a predetermined distance which is substantially equal to the distance in said latter direction between the spaced rollers which support the second movable vehicle, such that when the second movable vehicle is disposed upon said transport vehicle for transport, the spaced rollers of the transport vehicle are simultaneously disposed directly above the load beams and vertically proximate to the beam mounted rollers both in the direction of said predetermined and normal paths of travel, whereby the weight of the second movable vehicle is distributed directly and substatially entirely to said floor upon which said transport vehicle is supported through said vertically proximate beam rollers when the second movable vehicle is positioned upon said transport vehicle preventing deflection of the load beams.

2. The vehicle of claim 1 wherein each of said load supporting beams include at least one of said beam mounted rollers and said rollers are spaced from each other both in the direction of said predetermined and normal paths of travel.

3. The vehicle of claim 1 wherein said load supporting beams are also spaced from each other both in the direction of said predetermined and normal paths of travel, said load beams being spaced from each other in the direction of said predetermined path of travel by plate means, said plate means being positioned in non-supporting relationship to the second movable vehicle.

4. The vehicle of claim 1 including additional rollers on said transport vehicle associated with load support beams, said spaced rollers of the second movable vehicle being positioned between said spaced beam mounted rollers and said additional rollers, but substantially nearer said beam mounted rollers than said additional rollers, when the second movable vehicle is disposed upon said transport vehicle.

5. The vehicle of claim 1 wherein said support means on said transport vehicle includes at least a pair of rails on said transport vehicle supported by said load beams at points adjacent said beam mounted rollers, a plurality of spaced parallel rails on the floor upon which said transport vehicle moves in said predetermined path of travel, said beam mounted rollers rollably supporting said transport vehicle on said last mentioned rails, and said rails on said transport vehicle being notched adjacent said beam mounted rollers to accommodate the passage of said load beams and the spaced parallel floor rails therethrough.

6. A transport vehicle for transporting a second movable vehicle along a predetermined longitudinal path of travel substantially perpendicular to the normal longitudinal path of travel of said second movable vehicle, a plurality of first support means supporting said transport vehicle at a plurality of locations spaced a predetermined distance from each other in the direction of movement of said second movable vehicle along said normal path of travel, said first support means supporting said transport vehicle for movement along said predetermined path of travel, a plurality of second support means supporting said second movable vehicle at a plurality of locations also spaced from each other in the direction of movement of said second movable vehicle along said normal path of travel, by a distance substantially equal to said first mentioned distance and supporting said second movable vehicle for movement both relative to and independently of said transport vehicle, said second spaced support means being simultaneously substantially vertically alignable with respective ones of said first support means both in the direction of movement of said transport vehicle and second movable vehicle in said predetermined and normal paths of travel respectively, when said second movable vehicle is positioned on said transport vehicle for transport, whereby the weight of the second movable vehicle is distributed substantially entirely to said vertically aligned first support means and deflection of said transfer vehicle is minimized.

7. The vehicle of claim 6 wherein said transport vehicle includes a plurality of spaced load beams, said first support means being mounted upon said load beams, the spacing between said load beams in the direction of movement of second movable vehicle is said normal path of travel being substantially equal to the spacing distance of said second support means, whereby said second support means overlie said load beams when the second movable vehicle is positioned on said transport vehicle for transport.

8. The vehicle of claim 6 wherein said first and second support means include rollers.

* * * * *